May 12, 1925.  1,537,498

L. R. SCHMERTZ ET AL

TILTING TABLE FOR LEERS

Filed May 16, 1923  3 Sheets-Sheet 1

INVENTORS

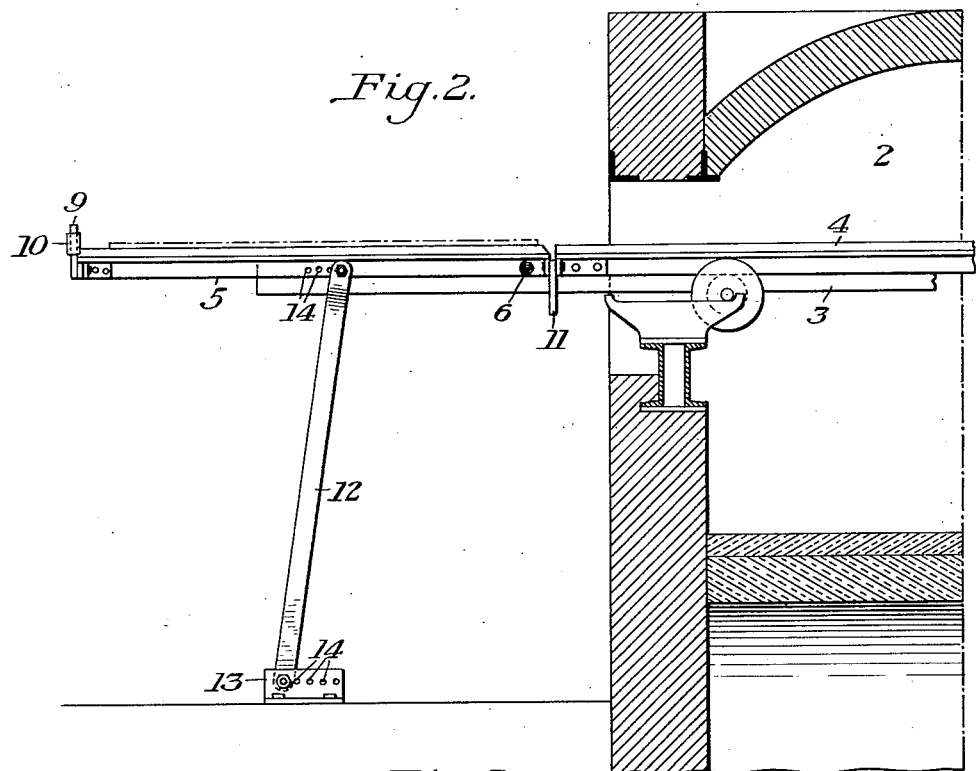

May 12, 1925.
L. R. SCHMERTZ ET AL
TILTING TABLE FOR LEERS
Filed May 16, 1923
1,537,498
3 Sheets-Sheet 3
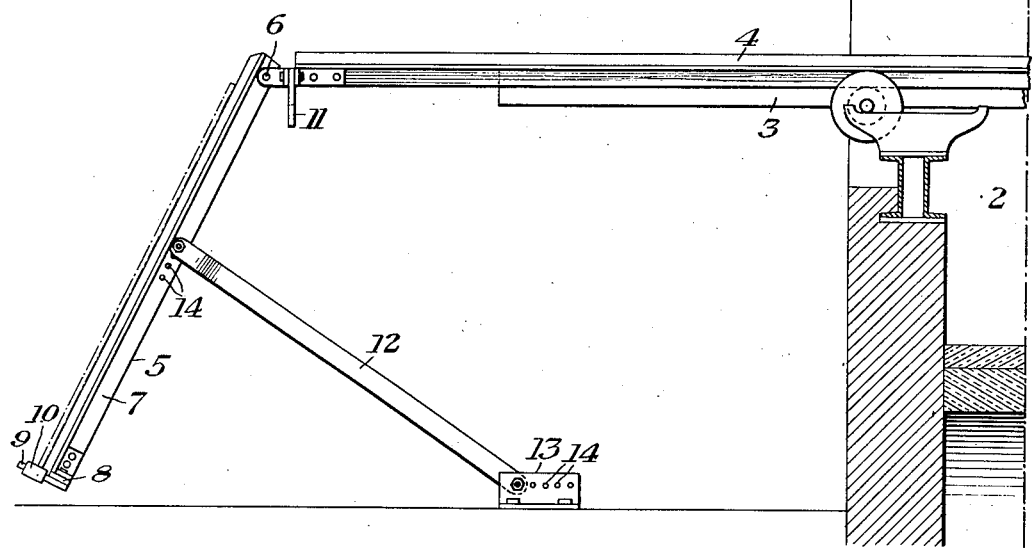
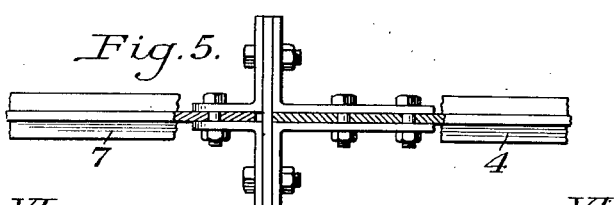
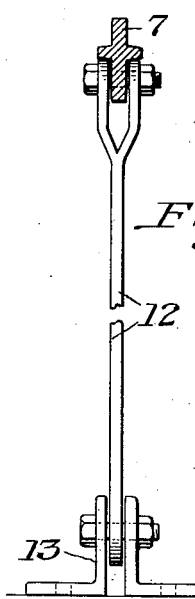
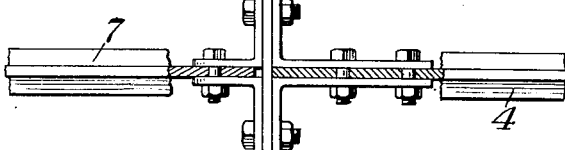
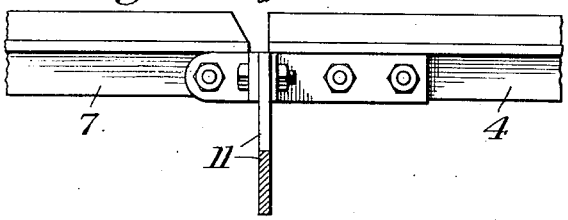
INVENTORS Patented May 12, 1925.

1,537,498

UNITED STATES PATENT OFFICE.

LOUIS R. SCHMERTZ, OF LIGONIER, AND LAWRENCE A. GESSNER, OF JEANNETTE, PENNSYLVANIA, ASSIGNORS TO WINDOW GLASS MACHINE COMPANY, OF PITTSBURGH, PENNSYLVANIA, A CORPORATION OF NEW JERSEY.

TILTING TABLE FOR LEERS.

Application filed May 16, 1923. Serial No. 639,330.

*To all whom it may concern:*

Be it known that we, LOUIS R. SCHMERTZ and LAWRENCE A. GESSNER, both citizens of the United States, residing, respectively, at Ligonier and Jeannette, county of Westmoreland, and State of Pennsylvania, have invented a new and useful Improvement in Tilting Tables for Leers, of which the following is a full, clear, and exact description.

This invention relates to tilting tables for leers, particularly leers for handling sheet glass, and is a continuation in part of the application of Kurtz, Byers, Schmertz and Gessner, Serial No. 557,657, filed May 1, 1922, for method of and apparatus for handling glass.

In handling large sheets of glass as it is delivered from a leer, considerable difficulty has been experienced with breakage due to the long reach necessary when the workman picks up the sheet. We provide a receiving table which is automatically tilted as the leer moves forward thus delivering the sheet substantially vertical so that it may be readily grasped and removed.

We also provide for tilting the table at a definite time in relation to the longitudinal movement of the leer. This is particularly valuable in the rod-type leer generally employed for handling sheet glass. In such a leer there are provided lifting rods which drop slightly below traveling rods when the glass is moved forward. The lifting rods necessarily extend over a portion of the receiving table in order to deliver glass to it. We provide for maintaining the table substantially horizontal until it has been moved beyond the lifting rods and for then tilting it. This insures that the glass will be moved out of contact with the lifting rods, thereby obviating scratching or breaking.

In the accompanying drawings showing the present preferred embodiment of the invention, Figure 1 is a horizontal section through the delivery end of a rod leer;

Figure 2 is a vertical section on the line II—II of Figure 1;

Figure 3 is an end view of the receiving table in horizontal position;

Figure 4 is a view corresponding to Figure 2 but showing the receiving table in tilted position;

Figure 5 is a detail view of the pivotal connection between the receiving table and the traveling rods;

Figure 6 is a section on the line VI—VI of Figure 5, and

Figure 7 is a detail view of the supporting links for the receiving table.

Figure 1:
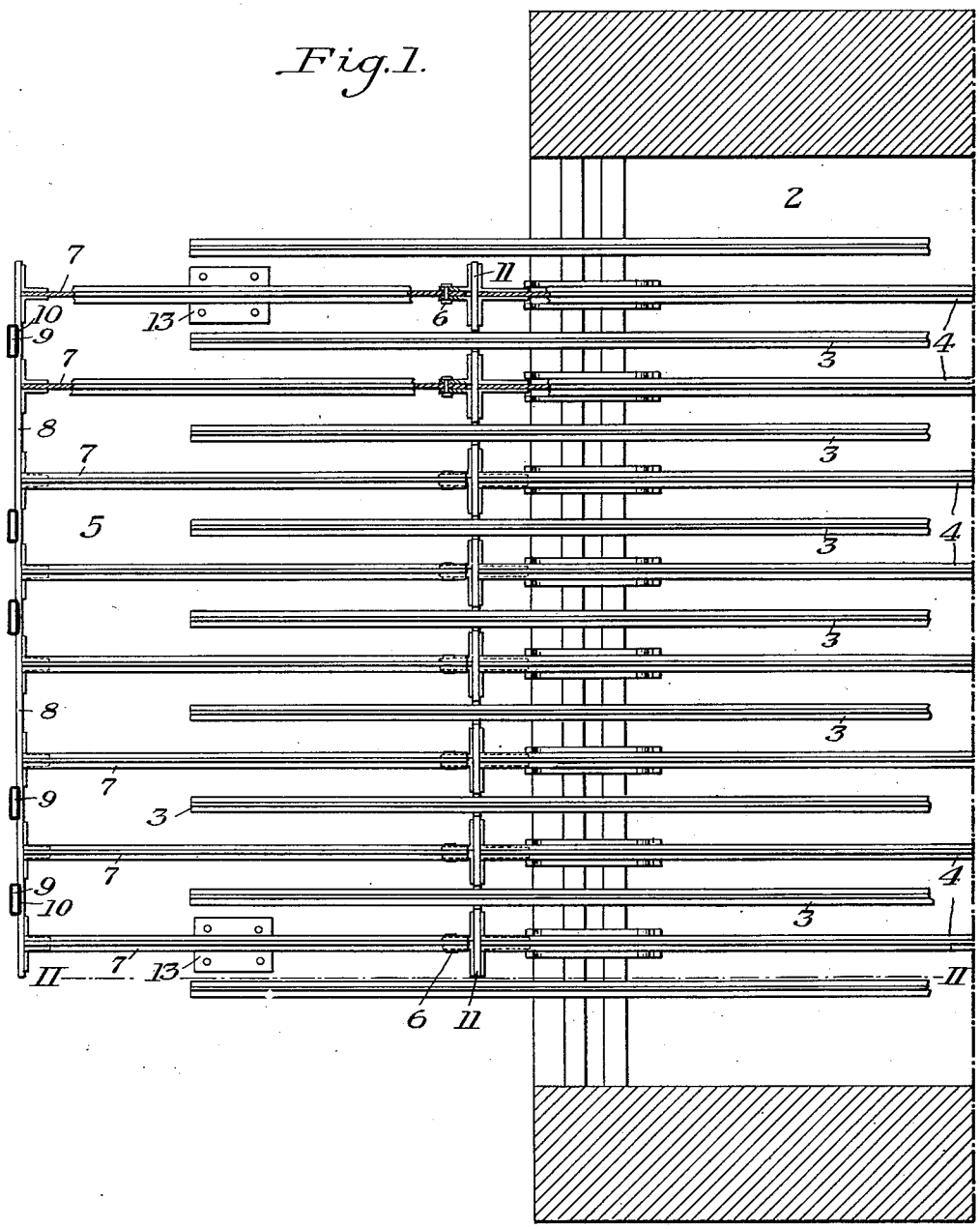

In the illustrated embodiment of the invention, a leer 2 having lifting rods 3 and traveling rods 4 is provided adjacent its delivery end with a receiving table 5. This table is pivoted at 6 to the traveling rods 4 and is preferably formed from rods 7 similar to those used in the leer. The rods 7 are connected at the outer end by a bar 8 having fingers 9, preferably provided with pads 10, extending upwardly therefrom to hold the glass on the table when it is in tilted position.

The traveling rods 4 are fastened together adjacent the pivotal connection of the table 5 by a cross bar 11. The cross bar 11 is slotted as best shown in Figure 3 to make room for the lifting rods 3. The bars 7 are pivotally connected to the cross piece 11 as best shown in Figures 5 and 6.

The table is preferably supported by links 12 attached to the table 5 at a point remote from the pivotal connection 6. The other end of the links may be pivotally supported in brackets 13 secured to the floor. A series of pivot holes 14 is provided for each end of each link 12 to allow for adjusting the links as may be necessary.

Glass sheets are moved through the leer by moving the traveling rods forward while the lifting rods are in their lower position, then lifting the lifting rods above the traveling rods, thus picking up the glass and holding it while the traveling rods are moved back to their original position. The lifting rods are then lowered and the glass deposited on the traveling rods for another step forward. As shown in Figure 1, the lifting rods 3 extend well over the table 5 and as the step-by-step movement of the leer is continued they will deposit a sheet of glass on the table 5 as they are lowered to the position of Figures 2 and 4. The next outward movement of the traveling rods will carry the table forward with the sheet of glass upon it. It will be noted that the links 12 are inclined toward the leer so that they tend first to tilt the table slightly upward before the downward movement begins. This first upward movement is very slight, depending upon the length and inclination of the links 12, the table being maintained substantially horizontal until the table 5 moves outwardly beyond the ends of the lifting rods 3. This avoids any possibility of breaking or scratching due to contact between the glass and the lifting rods as the table is tilted.

It will be apparent that after the links 12 pass beyond their vertical position, further outward movement of the traveling rods will cause the tilting table to move to its downwardly inclined position, shown in Figure 4. At this time a workman may easily grasp the edges of the sheet as it lies on the inclined table without having to bend over it or slide it on the supporting rods. Furthermore, this downward tilting movement occurs in definite timed relation to the movement of the traveling rods and is slow enough to obviate any danger of breakage or falling off of the glass sheet when the table reaches its lowermost position, as is likely to occur with a hand-tilted table. This automatically positions the sheets for removal by the workman as they are delivered from the leer and greatly facilitates the operation thereof.

We provide an automatically tilted receiving table for a glass leer which is of simple construction and which minimizes the breakage at the delivery end of a leer.

While we have illustrated the present preferred form of our invention, it will be understood that it is not limited to such form but may be otherwise embodied within the scope of the following claims.

We claim:

1. In a leer, a pivoted receiving table and means spaced from the pivot for supporting the table, said means including a point of support movable with respect to the pivot point of the table and thereby operating to tilt the table, substantially as described.

2. In a leer, a movable frame, a receiving table pivoted thereto, and means spaced from the pivot for supporting the table, said means including a point of support movable in a non-parallel direction relative to the pivot point of the table and thereby operating to tilt the table on movement of the frame, substantially as described.

3. In a leer, a reciprocable pivoted receiving table and a link for supporting the table, one end of the link being connected to the table at a point spaced from the pivot and the other end being connected to a point remote from the table, substantially as described.

4. In a leer, a reciprocable pivoted receiving table, a link for supporting the table, one end of the link being connected to the table at a point spaced from the pivot and the other end being connected to a point remote from the table, and means for adjusting the connecting points of the link, substantially as described.

5. In a leer, a reciprocable pivoted receiving table, a link for supporting the table, one end of the link being connected to the table at a point spaced from the pivot and the other end being connected to a point remote from the table, and means for adjusting at least one of the connecting points of the link, substantially as described.

6. In a leer, a movable receiving table, means for delivering an annealed article thereto, and means whereby the table is moved in a substantially horizontal direction for a part of its movement and thereafter tilted, substantially as described.

7. In a leer, traveling rods, a receiving table pivoted to the traveling rods and moving with them, lifting rods adapted to place an annealed article on the receiving table, and then move out of contact with the article, and means controlling the direction of movement of the table whereby the article is maintained out of contact with the lifting rods until the receiving table is moved past them such means being effective for thereafter tilting the table, substantially as described.

8. In a leer, traveling rods, a receiving table movable with the rods and having a plurality of supports normally lying substantially in the line of travel of the rods, and means for moving one of said supports out of said line of travel on movement of the rods, substantially as described.

9. In a leer, traveling rods, a receiving table movable with the rods and having a plurality of pivotal supports normally lying substantially in the line of travel of the rods, and means for moving one of said supports out of said line of travel on movement of the rods, substantially as described.

10. In a leer, means for moving articles therethrough, a reciprocably mounted pivoted table adapted to receive the article after it passes through the leer, and means having a fixed connection relative to the leer for tilting the table during reciprocation thereof, substantially as described.

11. In a leer, a reciprocably mounted receiving table adapted to receive an annealed article and means for normally maintaining said table in article receiving position, said means being effective for tilting the table to article delivery position in timed relation to the delivery of articles thereto, substantially as described.

12. In a leer, a reciprocably mounted receiving table having a plurality of points of support, said points of support being adapted to be moved in a non-parallel direction upon reciprocation of the table, substantially as described.

13. In a leer, a receiving table adapted to move toward and away from the leer, the table being pivotally mounted adjacent the edge nearest the leer and adapted to tilt about such pivotal mounting upon movement away from the leer, substantially as described.

In testimony whereof we have hereunto set our hands.

LOUIS R. SCHMERTZ.
LAWRENCE A. GESSNER.